(12) United States Patent  
Skene et al.

(10) Patent No.: US 7,707,289 B1  
(45) Date of Patent: \*Apr. 27, 2010

(54) METHOD AND SYSTEM FOR ENABLING PERSISTENT ACCESS TO VIRTUAL SERVERS BY AN LDNS SERVER

(75) Inventors: Bryan D. Skene, Seattle, WA (US); Peter M. Thornewell, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 725 days.

This patent is subject to a terminal disclaimer.

(21) Appl. No.: 11/379,557

(22) Filed: Apr. 20, 2006

Related U.S. Application Data

(63) Continuation of application No. 09/773,427, filed on Jan. 31, 2001, now Pat. No. 7,047,301.

(60) Provisional application No. 60/179,051, filed on Jan. 31, 2000.

(51) Int. Cl.  
*G06F 15/16* (2006.01)

(52) U.S. Cl. .................. 709/226; 709/217; 709/218; 709/219; 709/227; 709/228; 709/229; 709/232; 718/105

(58) Field of Classification Search ......... 709/217–219, 709/226–229, 232; 718/105  
See application file for complete search history.

(56) References Cited

U.S. PATENT DOCUMENTS

| | | | |
|---|---|---|---|
| 4,644,532 A | 2/1987 | George et al. | 370/94 |
| 4,965,772 A | 10/1990 | Daniel et al. | 364/900 |
| 5,023,826 A | 6/1991 | Patel | 364/736 |
| 5,053,953 A | 10/1991 | Patel | 364/200 |
| 5,299,312 A | 3/1994 | Rocco, Jr. | 395/200 |
| 5,327,529 A | 7/1994 | Fults et al. | 395/155 |
| 5,367,635 A | 11/1994 | Bauer et al. | 395/200 |

(Continued)

FOREIGN PATENT DOCUMENTS

EP  0 744 850 A2  11/1996

(Continued)

OTHER PUBLICATIONS

P. Vixie, "Domain Name Anarchy: Extension Mechanism for DNS," RFC 2671, Aug. 1999.*

(Continued)

*Primary Examiner*—Alina N. Boutah  
(74) *Attorney, Agent, or Firm*—Darby & Darby P.C.; John W. Branch (57) ABSTRACT

Disclosed are methods and systems for providing persistence across multiple requests in a WAN load-balanced environment. More than one load balancing system may be used to provide persistence while load balancing. One method and system disclosed provides persistence by using modulus arithmetic to load balance requests. Another method and system disclosed provides persistence using topology information contained in the request. Another method and system disclosed provides persistence by storing connection information to refer a timely continuation request of a prior request to the same server the prior request was referred to. When more than one load balancing system is used with this method, the load balancing systems periodically exchange the stored connection information so that each load balancing system may provide persistence to repeat requests.

20 Claims, 9 Drawing Sheets

U.S. PATENT DOCUMENTS

| | | | |
|---|---|---|---|
| 5,371,852 A | 12/1994 | Attanasio et al. | 395/200 |
| 5,406,502 A | 4/1995 | Haramaty | 364/551.1 |
| 5,475,857 A | 12/1995 | Dally | 395/800 |
| 3,950,735 A | 4/1996 | Patel | 340/172.5 |
| 5,517,617 A | 5/1996 | Sathaye et al. | 395/200.1 |
| 5,519,694 A | 5/1996 | Brewer et al. | 370/54 |
| 5,519,778 A | 5/1996 | Leighton et al. | 380/30 |
| 5,521,591 A | 5/1996 | Arora et al. | 340/826 |
| 5,528,701 A | 6/1996 | Aref | 382/178 |
| 5,581,764 A | 12/1996 | Fitzgerald et al. | 395/703 |
| 5,596,742 A | 1/1997 | Agarwal et al. | 395/500 |
| 5,606,665 A | 2/1997 | Yang et al. | 395/200.2 |
| 5,611,049 A | 3/1997 | Pitts | 395/200.9 |
| 5,663,018 A | 9/1997 | Cummings et al. | 430/5 |
| 5,752,023 A | 5/1998 | Chourci et al. | 395/610 |
| 5,761,484 A | 6/1998 | Agarwal et al. | 395/500 |
| 5,768,423 A | 6/1998 | Aref et al. | 382/228 |
| 5,774,660 A * | 6/1998 | Brendel et al. | 709/201 |
| 5,790,554 A | 8/1998 | Pitcher et al. | 370/471 |
| 5,875,296 A | 2/1999 | Shi et al. | 395/188.01 |
| 5,892,914 A | 4/1999 | Pitts | 395/200.49 |
| 5,919,247 A | 7/1999 | Van Hoff et al. | 709/217 |
| 5,936,939 A | 8/1999 | Des Jardins et al. | 370/229 |
| 5,946,690 A | 8/1999 | Pitts | 707/10 |
| 5,949,885 A | 9/1999 | Leighton | 380/54 |
| 5,959,990 A | 9/1999 | Frantz et al. | 370/392 |
| 5,974,460 A | 10/1999 | Maddalozzo, Jr. et al. | 709/224 |
| 5,983,281 A | 11/1999 | Ogle et al. | 709/249 |
| 6,006,260 A | 12/1999 | Barrick, Jr. et al. | 709/224 |
| 6,006,264 A | 12/1999 | Colby et al. | 709/226 |
| 6,026,452 A | 2/2000 | Pitts | 710/56 |
| 6,028,857 A | 2/2000 | Poor | 370/351 |
| 6,051,169 A | 4/2000 | Brown et al. | 264/40.1 |
| 6,078,943 A * | 6/2000 | Yu | 718/105 |
| 6,078,956 A | 6/2000 | Bryant et al. | 709/224 |
| 6,085,234 A | 7/2000 | Pitts | 709/217 |
| 6,092,178 A * | 7/2000 | Jindal et al. | 712/27 |
| 6,092,196 A | 7/2000 | Reiche | 713/200 |
| 6,108,703 A | 8/2000 | Leighton et al. | 709/226 |
| 6,111,876 A | 8/2000 | Frantz et al. | 370/392 |
| 6,119,143 A * | 9/2000 | Dias et al. | 709/201 |
| 6,233,541 B1 * | 5/2001 | Butts et al. | 703/27 |
| 6,370,571 B1 * | 4/2002 | Medin, Jr. | 709/218 |
| 6,374,300 B2 * | 4/2002 | Masters | 709/229 |
| 6,405,219 B2 * | 6/2002 | Saether et al. | 707/201 |
| 6,408,292 B1 * | 6/2002 | Bakalash et al. | 707/2 |
| 6,445,872 B1 * | 9/2002 | Sano et al. | 386/46 |
| 6,484,143 B1 * | 11/2002 | Swildens et al. | 709/223 |
| 6,671,259 B1 * | 12/2003 | He et al. | 370/238 |
| 6,754,706 B1 * | 6/2004 | Swildens et al. | 709/225 |
| 6,910,220 B2 * | 6/2005 | Hickey et al. | 725/39 |
| 6,970,933 B1 * | 11/2005 | Masters | 709/229 |
| 7,441,045 B2 * | 10/2008 | Skene et al. | 709/241 |
| 7,590,625 B1 * | 9/2009 | Tennican et al. | 707/3 |
| 2001/0023442 A1 * | 9/2001 | Masters | 709/227 |
| 2001/0042073 A1 * | 11/2001 | Saether et al. | 707/203 |
| 2001/0049741 A1 * | 12/2001 | Skene et al. | 709/232 |
| 2002/0040400 A1 * | 4/2002 | Masters | 709/228 |
| 2002/0087707 A1 * | 7/2002 | Stewart et al. | 709/230 |
| 2005/0183127 A1 * | 8/2005 | Ngo et al. | 725/90 |
| 2008/0016216 A1 * | 1/2008 | Worley et al. | 709/226 |
| 2008/0288646 A1 * | 11/2008 | Hasha et al. | 709/228 |

FOREIGN PATENT DOCUMENTS

| | | |
|---|---|---|
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

Reardon, Marguerite, "A Smarter Session Switch: Arrowpoint's CS Session Switches Boast The Brain Needed For E-Commerce," *Data Communications*, Jan. 1999, title page, pp. 3, 5, 18.

Hewitt, John R. et al., "Securities Practice and Electronic Technology," Corporate Securities Series, (New York: Law Journal Seminars-Press) 1998, title page, bibliography page, pp. 4.29-4.30.

"A Process For Selective Routing of Servlet Content To Transcoding Modules," *Research Disclosure 422124*, IBM Corporation, pp. 889-890, Jun. 1999.

"Servlet/Applet/HTML Authentication Process With Single Sign-On," *Research Disclosure 429128*, IBM Corporation, pp. 163-164, Jan. 2000.

* cited by examiner

METHOD AND SYSTEM FOR ENABLING PERSISTENT ACCESS TO VIRTUAL SERVERS BY AN LDNS SERVER

RELATED APPLICATIONS

This utility patent application is a continuation of U.S. patent application Ser. No. 09/773,427 filed on Jan. 31, 2001, which claims priority to U.S. Provisional Patent Application Ser. No. 60/179,051 filed on Jan. 31, 2000, the benefit of the filing date of which is hereby claimed under 35 U.S.C. §119(e), and the disclosures of which are incorporated by reference in their entirety herein.

FIELD OF THE INVENTION

The present invention relates to persistent access to virtual servers and, more particularly, to persistent access to load balanced virtual servers distributed across a wide area network (WAN).

BACKGROUND

As the Internet continues to grow, and as more and more users begin to visit Web sites, the demand for Web servers grows. For a small company, one server may be enough to accommodate users accessing the company's website. A medium sized company may have an array of servers located at one site and managed by a SAC (SAC). A SAC receives requests from users to view content on a company's site and then selects a particular server controlled by the SAC, possibly using load balancing metrics. An enterprise sized business often has SACs placed in many different topological locations. Each SAC controls a different array of servers. Ideally, when a user requests a service, a WAN load balancing mechanism refers the user's request to the SAC best able to deal with the user's request.

A problem occurs when a user is engaged in a transaction-oriented process. The user may be shopping online at a retailer's website and filling a shopping cart with items to be purchased later. A SAC responding to requests to the retailer's website will assign the user's request to a server. The user's computer and the server will establish a session. In the middle of a transaction, the user may decide to discontinue the session and visit a different website or engage in another activity which closes the session the user has with the server containing the shopping cart items. Later, the user may decide to complete the transaction and purchase the items previously placed in the shopping cart. When the user returns to the retailer's website, the user may find that the shopping cart no longer contains the items the user previously selected. This may occur because the user's requests are not referred to the same server. When the user returns to complete the transaction, the user's request may be referred to a server that is unaware of the user's previous actions, e.g., placing items in the shopping cart.

Generally, the more layers of load balancing that are employed, the more difficult it becomes to refer a user's request to the same server. For example, when no load balancing is employed, e.g. when a company only employs one Web server and all requests are serviced by the server, the user requests only have one server to go to. To maintain a shopping cart for the user, the Web server needs to recognize that the request comes from a prior user and retrieve the appropriate data, e.g., the items in the shopping cart.

When a company has servers managed by a SAC, more is required to provide that all of one user's requests go to the same server (persistence). Merely having the server recognize that a request comes from a prior user is not usually enough. Without information sharing among servers, if the SAC refers a subsequent request to a different server, the different server usually will have no information about what items the user had in a shopping cart. Therefore, in addition to the server recognizing a subsequent request from the user and retrieving the appropriate information, the SAC should refer the subsequent request to the server the SAC referred the user's prior requests to.

When a company has SACs load balanced by a WAN load balancing mechanism, even more is required to provide for persistence. A large company may have server arrays placed in several geographical areas with each server array managed by a SAC. Information available to a SAC such as user IP address may not be available to the WAN load balancing mechanism. If the WAN load balancing mechanism refers a subsequent user request to a different SAC than prior requests were referred to, persistence may be lost.

SUMMARY

In accordance with the present invention, there is provided an apparatus and method for providing persistence across multiple requests in a WAN load-balanced environment. The invention replaces a domain name system (DNS) server with one or more extended DNS (EDNS) servers. The EDNS server load balances traffic and maintains information about requests from local domain name system (LDNS) servers.

In one aspect of the invention, modulus arithmetic is used to increase persistence. When an LDNS server requests a domain name resolution, the EDNS server determines which virtual servers in which SACs are available and uses modulus arithmetic to select a virtual server. The LDNS server is then referred to a SAC managing the selected virtual server and user requests are directed to the virtual server. This approach decreases the connections broken between users and servers as servers become available or unavailable.

In another aspect of the invention, topology information is used to increase persistence. When an LDNS server requests a domain name resolution, the EDNS server refers the LDNS server to the SAC servicing requests from that LDNS server. A group of LDNS servers may be referred to the same SAC. Typically, this "topological" approach provides persistence as long as a user uses the same LDNS server. It may also provide persistence even if a user uses a different LDNS server for some requests, provided that the different LDNS server is also mapped to the same SAC.

In yet another aspect of the invention, the EDNS server maintains information about which LDNS server was referred to which SAC. In this dynamic approach, the EDNS server keeps track of which SAC it referred an LDNS server to when the LDNS server requested a domain name resolution. When the LDNS server requests the same domain name resolution again, the EDNS server uses the previous information to refer the LDNS server to the previously referred to SAC. This allows the EDNS server to use more sophisticated load balancing techniques while maintaining persistence.

In another aspect of the invention, more than one EDNS servers are dynamically load balancing requests from LDNS servers. In this aspect of the invention, the EDNS servers periodically share request information so that each EDNS server can refer a subsequent request from a previous LDNS server to the appropriate SAC.

These and various other features as well as advantages, which characterize the present invention, will be apparent from a reading of the following detailed description and a review of the associated drawings.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims. Prior to describing the invention in greater detail, a list of some terms and their definitions is provided below.

DEFINITION OF TERMS

Client/Server—Client refers to a process or electronic device requesting information or services from another process or electronic device. The other process or electronic device is frequently referred to as a server. A server provides requested information or services to another process or electronic device. A process or device that acts as a client at times may at other times act as a server. Conversely, a process or device that acts as a server may at other times act as a client. In addition, a client and a server may physically reside on the same electronic device.

Domain name resolution—A process by which a domain name is translated into an IP address. For one implementation of domain name resolution see Paul Albitiz & Cricket Liu, *DNS and BIND* (3$^{rd}$ ed. 1998).

Including—Unless explicitly otherwise noted or clear from the context, including means "including, but not limited to."

Illustrative System for Providing Persistence

Figure 1:
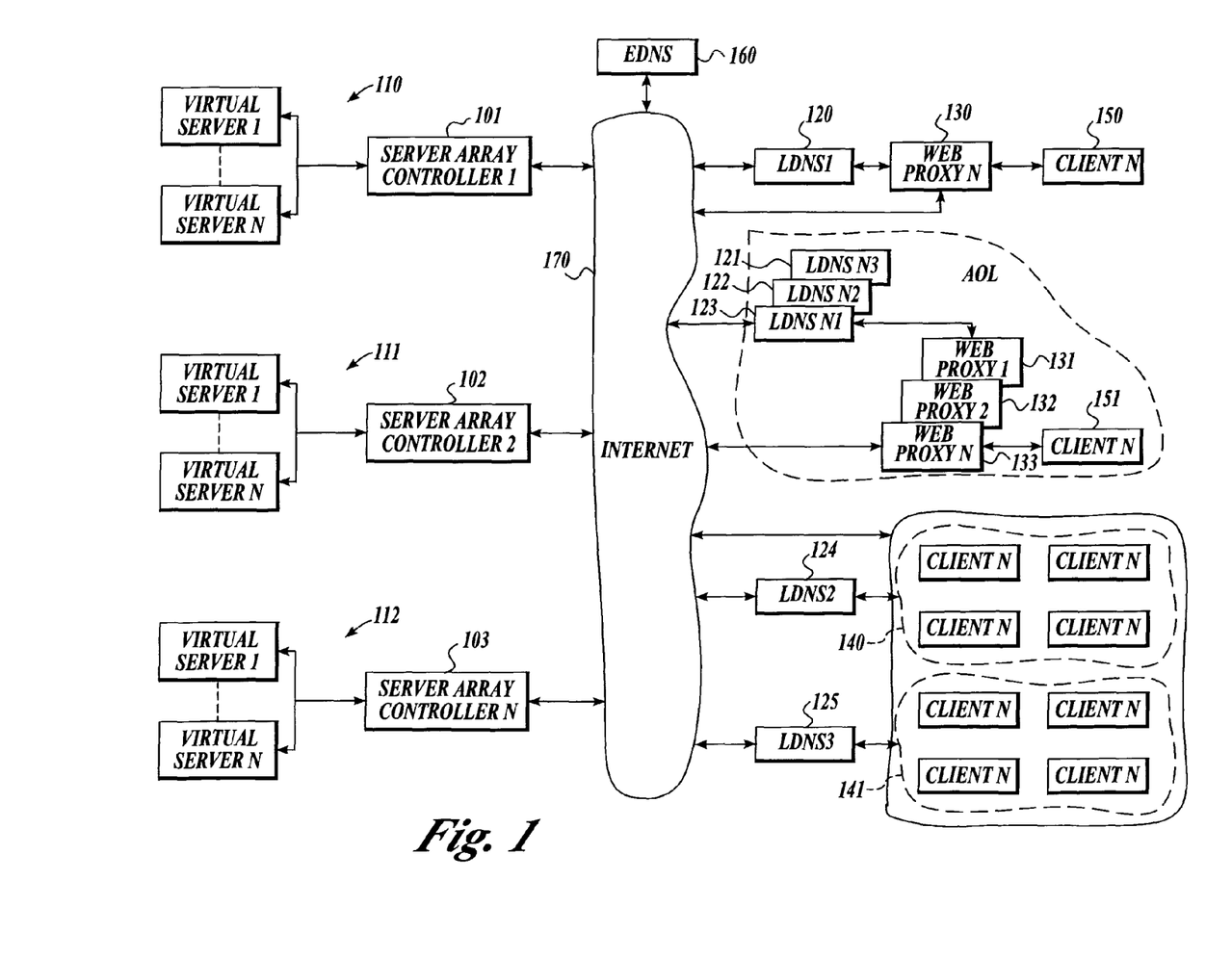
FIG. 1 shows a system diagram for providing persistence over a load balancing WAN.

FIG. 1 shows a system diagram for providing persistence over a load balancing WAN. The system includes SACs 101-103, virtual server arrays 110-112, LDNS servers 120-125, web proxies 130-133, client pools 140 and 141, clients 150 and 151, virtual ENDS server 160, and Internet 170. Client pool 140 includes clients substantially similar to clients 150 and 151, with each client in client pool 140 using LDNS server 124 to request domain name resolution. Client pool 141 includes clients similar to clients 150 and 151, with each client in client pool 141 using LDNS server 125 to request domain name resolution.

SACs 101, 102, and 103 manage virtual server arrays 110, 111, and 112, respectively. SACs 101-103 interface with Internet 170. SAC 101 may be used, for example, to load balance requests to a company's web site to the servers in virtual server array 110. When a request comes for information or services, a server array controller, such as SAC 101, refers the request to one of the servers in the server array it manages, e.g. server array 110. For WAN load balancing, SACs 101-103 may be located in different geographical locations to better handle company web site requests from different geographical locations.

Virtual server arrays 110-112 are connected to SACs 101-103, respectively. A virtual server array may include one or many physical servers. When a virtual server array includes more than one physical server, the physical servers may be of the same processing power or of unequal processing power. Furthermore, when multiple physical servers implement a virtual server array, each physical server may represent a different number of virtual servers.

Client machines, such as clients 150, 151, and the clients in client pools 140 and 141, are sometimes shown interfacing directly with LDNS servers and at other times interfacing with LDNS servers through a web proxy. A client machine is any device capable of sending information to or receiving information from a network. Client machines include personal computers, hand-held devices, multiprocessor systems, microprocessor-based or programmable consumer electronics, network PCs, minicomputers, mainframe computers, and the like.

A web proxy, such as web proxy 130, acts as an interface between a client machine and a network. For outbound messages, the web proxy translates client commands into commands an LDNS server can utilize and into a protocol needed to interface with the network. For inbound messages, the web proxy translates messages into information suitable for the client machine. A web proxy may reside on the same device the client machine does or it may reside on another device that is communicating with the client machine.

An LDNS server, such as LDNS server 120, is generally used to resolve Internet domain names. Resolving Internet domain names involves translating a domain name, such as www.domain.com, into an Internet address, such as 198.168.3.5. An LDNS server typically maintains a table of recent translations in memory so that it can quickly provide IP addresses for recently requested domain names. Frequently, however, the LDNS server does not have the IP address for a particular domain name. When the LDNS server does not have the IP address for a domain name, the LDNS server sends the domain name to another computer and requests the IP address. The other computer may refer the LDNS server to another computer which may refer the LDNS server to another computer, etc. Eventually, the LDNS server obtains an IP address (or an error) for the domain name. After it receives the IP address, the LDNS server stores it in its internal tables and provides it to the requestor.

Generally, an EDNS server, such as virtual EDNS server 160, is the last device an LDNS server is referred to when finding an IP address associated with a domain name. Virtual EDNS server 160 is connected to Internet 170. Virtual EDNS server 160 receives a domain name resolution request and returns an IP address associated with the domain name. A domain name may have several IP addresses associated with it. For example, to serve requests to a high traffic website, a company may have several arrays of servers, e.g., virtual server arrays 110-112, each controlled by a different SAC, e.g., one of SACs 101-103. Each SAC usually has at least one IP address associated with it. Typically, the IP address returned by the EDNS server corresponds to an address of one of the SACs.

Virtual EDNS server 160 may be configured to load balance client requests across the SACs according to a variety of load balancing metrics, including packet rate of each SAC, CPU utilization of the SAC, and number of connections serviced by the SAC. In addition, information about packets between servers in the server array managed by the SAC and clients may be used for load balancing. Such information includes round trip time, packet loss, and hops. These, and other metrics may be used in addition to topological load balancing to refer a request to a particular server.

For example, virtual EDNS server 160 may use topological information calculated from the IP address of the requesting LDNS server to decide which SAC's IP address to return. Alternatively, virtual EDNS server 160 may use a round robin approach to returning a SAC's IP addresses in which the EDNS server loops through available SACs, returns the first available SAC's IP address, and then increments a counter to point to the next SAC's IP address. In another load balancing technique, virtual EDNS server 160 may collect availability information from each of the SACs including such information as number of requests currently being serviced, effective load, and availability to service a request, and then make decisions as to which SAC's IP address will be returned to the client based on this gathered information.

To provide persistence, virtual EDNS server 160 generally refers subsequent requests for the same domain name resolution from a prior requestor to the same SAC virtual EDNS server 160 referred prior requests. Providing persistence depends on the load balancing technique selected and is described in detail in conjunction with FIGS. 2-9.

A virtual EDNS server may include one or more physical EDNS servers. When this occurs, depending on the load balancing technique selected, the physical EDNS servers may share information with each other so that each can provide persistence and appear to domain name resolution requestors to be a single EDNS server (a virtual EDNS server). This is described in detail in conjunction with FIGS. 4-6.

Internet 170 is a WAN of servers, routers, gateways, switches, and hubs that connects client machines to server machines. Internet 170 may include wireless communication, including satellite systems, radio networks, television broadcasts, microwave transmissions, and the like, and wired communication, including telephone, twisted pair, coaxial cable, wave guides, fiber optic, and the like. In FIG. 1, Internet 170 connects clients 150 and 151 (through proxies) and clients in client pools 140 and 141 to SACs 101-103. Internet 170 connects LDNS servers 120-125 to virtual EDNS server 160. Although not shown in FIG. 1, Internet 170 may connect web proxy 130 to LDNS server 120, web proxies 131-133 to LDNS servers 121-123, and/or clients in client pools 140 and 141 to LDNS servers 124 and 125.

Clients have many ways of accessing Internet 170. FIG. 1 shows three such ways. A client may access the Internet through a web proxy, wherein the web proxy sends messages to and receives messages from the Internet and requests domain name resolution from an LDNS server. For example, client 150 utilizes web proxy 130 to access Internet 170. Web proxy 130 sends messages to and receives messages from Internet 170 and uses LDNS server 120 to resolve domain names.

Alternatively, a client may be dynamically assigned to one of a number of web proxies when connecting to the Internet. Additionally, each web proxy may be dynamically assigned to one of a number of LDNS servers when requesting domain name resolution. This may occur to load balance Internet access and domain name resolution. Providing persistence for this type of configuration is described in more detail in conjunction with FIG. 5. For example, for one web request, client 151 may be assigned any one of web proxies 131-133 to connect to Internet 170. Web proxies 131-133 may be assigned any one of LDNS servers 121-123 to resolve domain names. For another web request, client 151 may be assigned a different web proxy which may be assigned a different LDNS server.

Alternatively, a group of clients may access the Internet directly but may share an LDNS server to resolve domain names. Providing persistence for this type of configuration is described in more detail in conjunction with FIG. 4. For example, clients in client pool 140 may directly access Internet 170 but use LDNS server 124 to resolve domain names.

Computing systems, such as the ones shown in FIG. 1, typically include at least some form of computer-readable media. Computer readable media can be any available media that can be accessed by the computing device. By way of example, computer-readable media might comprise computer storage media and communication media.

Computer storage media includes volatile and nonvolatile, removable and non-removable media implemented in any method or technology for storage of information such as computer readable instructions, data structure, program modules or other data. Computer storage media includes RAM, ROM, EPROM, flash memory or other memory technology, CD-ROM, digital versatile disk (DVD) or other optical storage, magnetic cassettes, magnetic tape, magnetic disk storage or other magnetic storage devices, or any other medium that can be used to store the desired information and that can be accessed by a computing device.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Illustrative Method for Selecting a Load Balancing Mode

Figure 2:
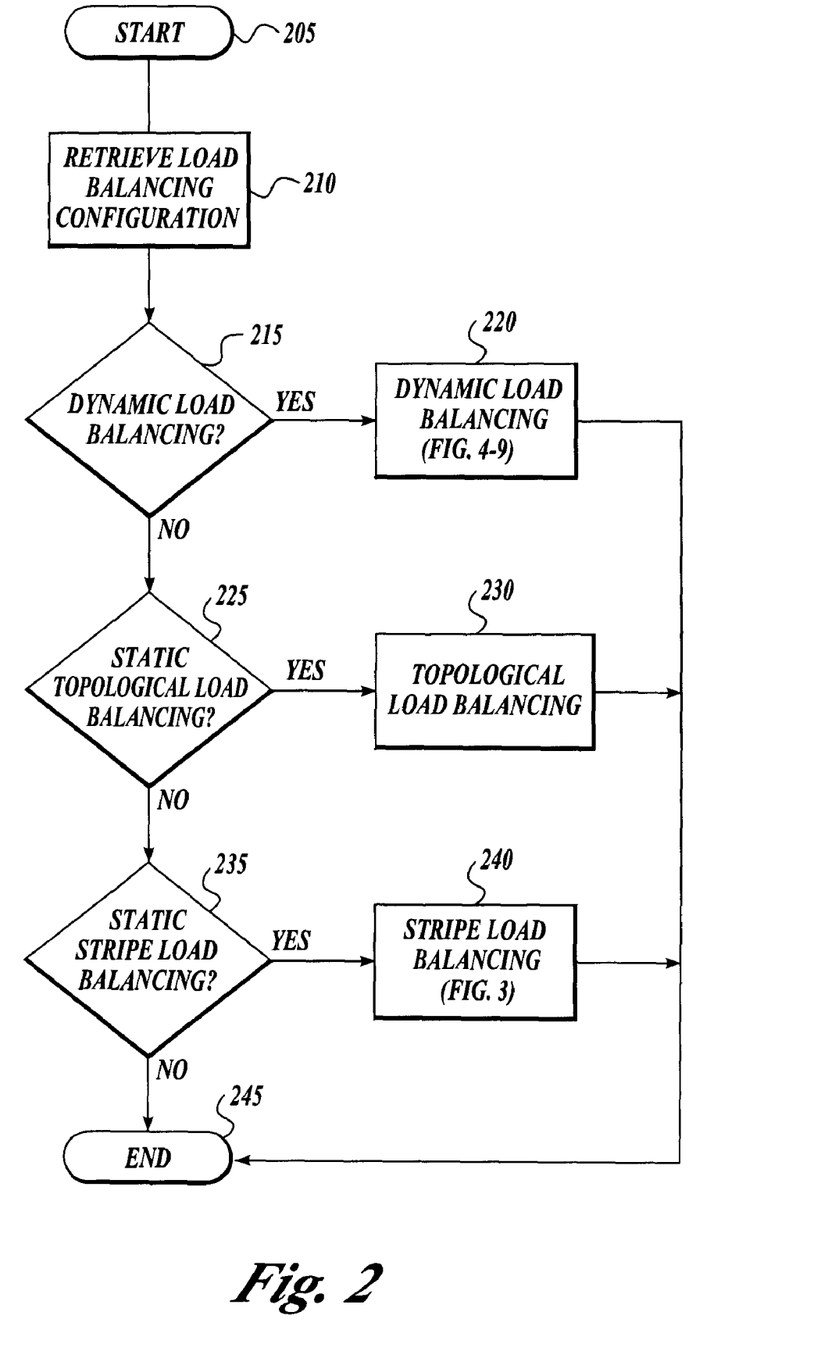
FIG. 2 illustrates a flow chart for providing persistence while performing static and dynamic load balancing.

FIG. 2 illustrates a flow chart for providing persistence while performing static and dynamic load balancing. The process begins at block 205 after WAN load balancing is enabled. For example, referring to FIG. 1, virtual EDNS server 160 is activated to begin load balancing.

At block 210, load balancing configuration data is retrieved. Load balancing configuration data includes information about what type of load balancing has been selected, e.g. dynamic, topological, stripe, etc., SAC IP addresses to load balance requests to, and time to live for connection objects. For example, referring to FIG. 1, virtual EDNS server 160 retrieves load balancing information (not shown).

At block 215, a determination is made as to whether the load balancing configuration data indicates that dynamic load balancing should be performed. When dynamic load balancing should be performed, the yes branch is followed and processing continues at block 220. Otherwise, the no branch is followed and processing continues at block 225.

At block 220, dynamic load balancing is performed as described in more detail in conjunction with FIGS. 4-9. Briefly, a determination is made as to whether a request should be associated with a previous request. When the request should be associated with a previous request, the load balancer returns the IP address of the SAC it returned for the previous request, provided that the SAC is available. The process of returning an IP address of a SAC in response to a domain name request is hereinafter referred to as "resolving the request to a SAC". When the request should not be associated with a previous request, the load balancer resolves the request to a SAC using various statistics described in detail in conjunction with FIG. 1. For example, referring to FIG. 1, virtual EDNS server 160 receives a domain name resolution request from LDNS server 120. Virtual EDNS server 160 recently received a domain name resolution request from LDNS server 120 for the same domain name. Virtual EDNS server 160 resolved the prior domain name to the IP address of SAC 101, so virtual EDNS server 160 resolves the current request to SAC 101. Additionally, when the actions at block 220 are completed, the process moves to an end block 245 and returns to processing other actions.

Alternatively, when the determination at block 215 is negative, the process continues at block 225 where a determination is made as to whether static topological load balancing is selected. If affirmative, processing continues at block 230. For example in FIG. 1, virtual EDNS server 160 determines whether static topological load balancing should be performed using load balancing configuration data (not shown).

At block 230, topological load balancing is performed. Topological load balancing does not necessarily mean that all requests from one physical region, e.g., the United States, will be resolved to one SAC while all requests from another physical region, e.g., Europe, will be resolved to another SAC. An LDNS server, such as LDNS server 121, does not typically provide its physical location when requesting a domain name resolution from an EDNS server, such as virtual EDNS server 160. Normally, an LDNS server provides its IP address and a domain name that needs to be resolved. While it may be possible to map an LDNS server IP address to a physical location, topological load balancing refers more to load balancing requests based on the requesting LDNS server IP address than upon the physical location of the LDNS server. Thus, using topological load balancing, requests from LDNS servers with IP addresses in one set of IP addresses are resolved to one SAC and requests from LDNS servers with IP addresses in another set of IP addresses are resolved to another SAC. For example, referring to FIG. 1, virtual EDNS server 160 resolves requests from LDNS server 120 to SAC 101 and resolves requests from LDNS servers 121-123 to SAC 102. Additionally, when the actions at block 230 are completed, the process continues at end block 245 and returns to processing other actions.

Also, when the determination at block 225 is found to be negative, the process continues at block 235 where a determination is made as to whether static stripe load balancing should be performed. When the determination is negative at block 235, the processing continues at end block 245 and returns to processing other actions.

Figure 3:
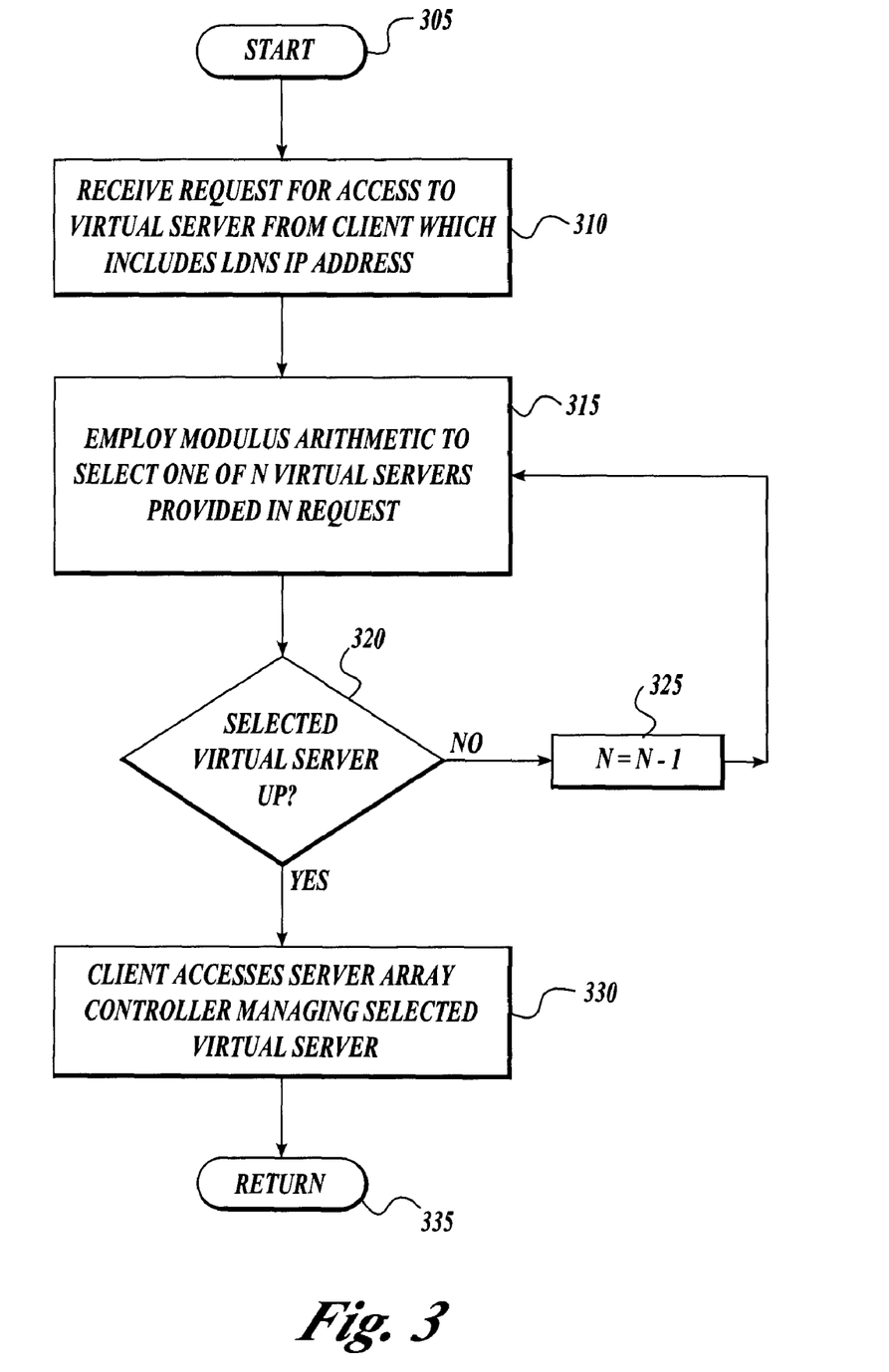
FIG. 3 shows a flow chart for providing persistence using static stripe load balancing.

Alternatively, when static stripe load balancing is determined to be selected at block 235, processing continues at block 240 where the static stripe load balancing is performed (described in detail in conjunction with FIG. 3). Briefly stated, using modulus arithmetic, each request is resolved to a SAC depending on the availability of virtual servers controlled by SACs servicing requests for resources associated with the domain name. For example, referring to FIG. 1, virtual EDNS server 160 receives a request from LDNS server 124. Virtual EDNS server 160 performs modulus arithmetic and determines to which SAC it will resolve the domain name. Virtual EDNS server 160, then returns the SAC's IP address to LDNS server 124. Additionally, when the actions at block 240 are completed, the process continues at end block 245 and returns to processing other actions.

The remainder of this disclosure describes methods and systems for providing persistence when either dynamic or static load balancing mechanisms are used. First, a method and system for providing persistence when a dynamic load balancing system is employed is disclosed. Then, a method and system for providing persistence using static stripe load balancing is disclosed.

Figure 4:
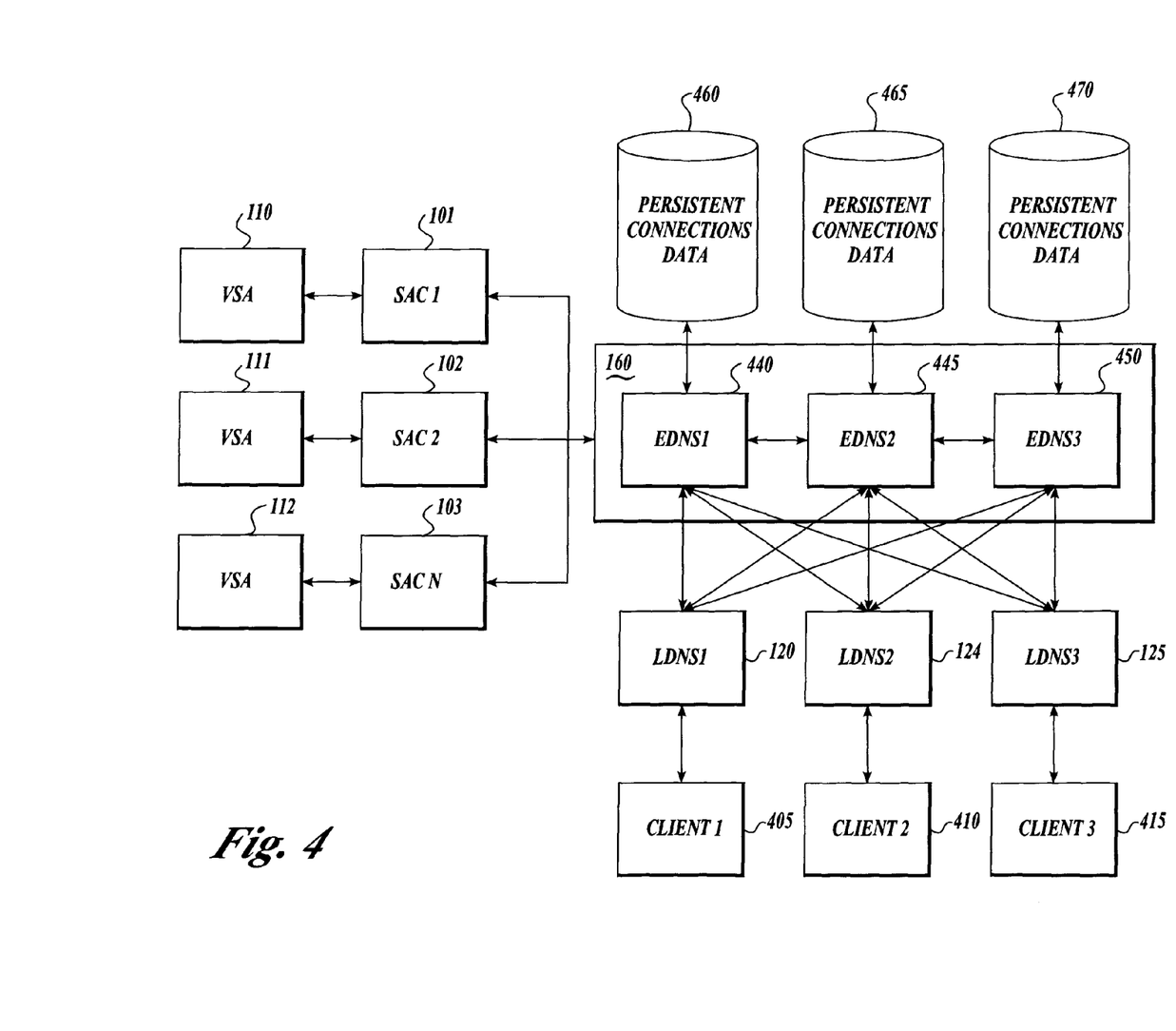
FIG. 4 shows a system diagram for providing persistence when a client repetitively uses the same LDNS server for domain name resolution.
Figure 5:
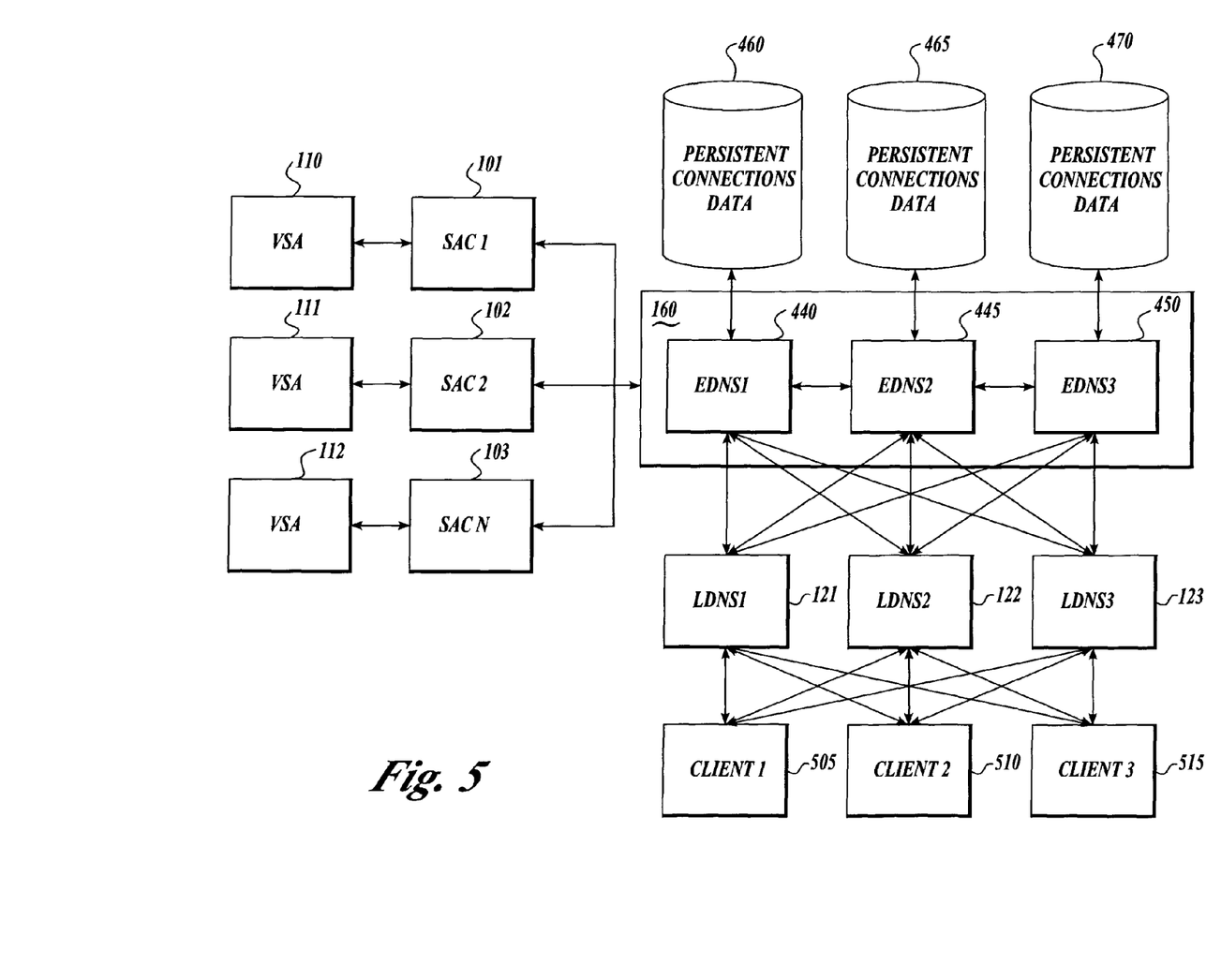
FIG. 5 shows a system diagram for providing persistence when a client may use different LDNS servers for domain name resolution.

Illustrative Method and System for Providing Persistence During Dynamic Load Balancing FIGS. 4-9 illustrate drawings to show an embodiment of the invention that provides for persistence during dynamic load balancing. FIGS. 4 and 5 show block diagrams for systems that provide persistence when clients repetitively use the same LDNS server to request domain name resolution and when clients are free to use a different LDNS server for each domain name resolution request.

FIG. 4 shows a system for providing persistence when a client repetitively uses the same LDNS server for domain name resolution. FIG. 4 includes virtual server arrays 110-112, SACs 101-103, virtual EDNS server 160, LDNS servers 120, 124, and 125, and clients 405, 410, and 415. Virtual EDNS server 160 operates as described in detail in conjunction with FIG. 1 and includes physical EDNS servers 440, 445, and 450. Physical EDNS servers 440, 445, and 450 are associated with persistent connections data stores 460, 465, and 470, respectively.

Virtual server arrays 110, 111, and 112 are connected to SACs 101, 102, and 103 and operate as described in conjunction with FIG. 1. LDNS servers 120, 124, and 125 connect to virtual EDNS server 160 through a network (not shown). Lines go from each of the LDNS servers to each of the physical EDNS servers indicating that an LDNS server's domain name resolution request may be resolved by any of the physical EDNS servers and that the physical EDNS server answering an LDNS server domain name resolution request may change from request to request. Clients 405, 410, and 415 are associated with LDNS servers 120, 124, and 125 respectively. Clients 405, 410, and 415 do not change LDNS servers from request to request, although a client may change to a new LDNS server when, for example, the client is reconfigured to access the Internet through a different Internet service provider. Generally, however, the frequency at which a client changes LDNS servers is low, and it is assumed that the client keeps the same LDNS server throughout a transaction for purposes of this figure.

Figure 6:
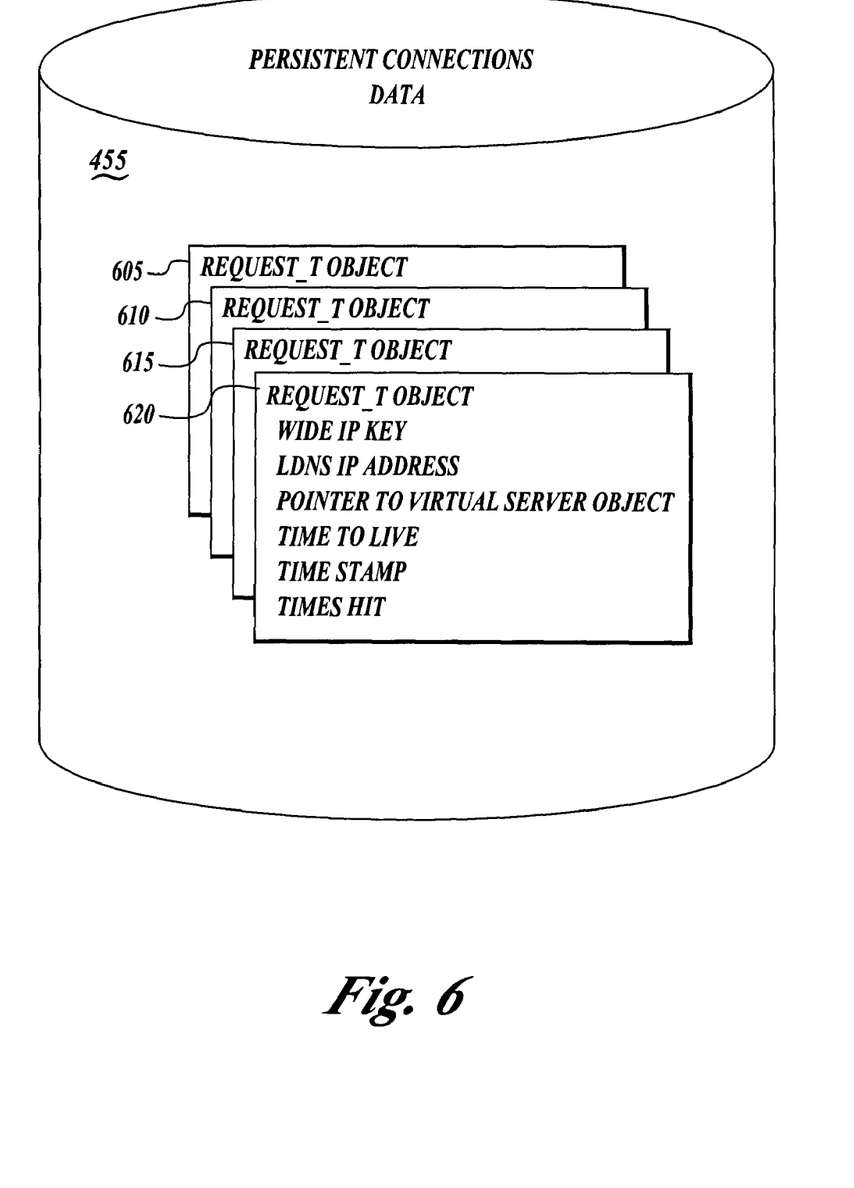
FIG. 6 shows illustrative data that may be included in a persistent connections data store.

Persistent connection stores 460, 465, and 470 store information associated with previous domain name resolution requests as described in more detail in conjunction with FIG. 6. Briefly stated, each persistent connection store maintains domain name request information so that future domain name requests can be associated with prior domain name requests, so that virtual EDNS server 160 may maintain persistence across related requests.

Periodically, physical EDNS servers 440, 445, and 450 exchange information contained in persistent connections data stores 460, 465, and 470. An LDNS server may request resolution for a domain name from one physical server with one request and may then request resolution for the domain name from another physical server with another request. By sharing persistent connections information, the physical EDNS servers are able to avoid losing persistence.

This can be explained through the following example. Suppose that LDNS server 120 first requested domain name resolution of www.domain.com from EDNS server 440. EDNS server 440 performs load balancing calculations and determines that SAC 101 is best able to satisfy future client requests for information or services. Subsequently, EDNS server 440 returns the IP address of SAC 101 to LDNS server 120 which then returns it to client 405.

Network conditions may require LDNS server 120 to shortly thereafter again request domain name resolution for www.domain.com. For example, LDNS server 120 may be servicing several domain name resolutions requests. Although an LDNS server generally has local storage to store the results of domain name resolutions requests, this storage may fill up quickly when the LDNS server is servicing several domain name resolution requests. When the storage is full, the LDNS server begins to overwrite older entries. Thus, if enough requests to resolve domain names come to LDNS server 120 between client 405's first and second request to resolve www.domain.com, LDNS server 120 may no longer have the IP address associated with www.domain.com in its local storage and may be required to return to an EDNS server to resolve the domain name.

Alternatively, time to live settings may cause LDNS server 120 to again request domain name resolution for www.domain.com. For example, an EDNS server may set a relatively short time to live for domain name resolutions it fulfills in response to requests from LDNS server 120. This may cause LDNS server 120 to expire its local mapping to the domain name between a first and a second request because the time to live has expired. When its local mapping has expired, LDNS server 120 returns to an EDNS server for domain name resolution. An EDNS server may be configured to set a short time to live on domain name resolutions to force LDNS servers to frequently return for domain name resolution so that the EDNS server may re-route requests in the event of a SAC outage.

When LDNS server 120 searches for an IP address for www.domain.com, it may connect to a different physical EDNS server than the physical EDNS server it first asked for resolution of www.domain.com. For example, it may connect to physical EDNS server 445. If physical EDNS server 445 is unaware that physical EDNS server 440 previously satisfied a domain name resolution request for www.domain.com for LDNS server 120, physical EDNS server 445 may perform load balancing calculations and determine that SAC 102 is best able to satisfy future client requests for information or services. When physical EDNS server 445 does this, a potential for losing persistence is created because client 405 could be attempting to complete a transaction with a virtual server in virtual server array 110 (the one managed by SAC 101).

This embodiment of the invention avoids the problem discussed above by periodically sharing persistent connections data between the physical EDNS servers. Updates are provided to the persistent connections data store of each physical EDNS server so that each physical EDNS can correctly recognize a subsequent request to resolve the domain name. Once recognized, the EDNS server can use the shared persistent connections data to provide the previous SAC IP address to the requesting LDNS server. Thus, by periodically sharing persistent connections data, the physical EDNS servers appear to act as one "virtual" EDNS server. For example, physical EDNS server 445 recognizes that the request from LDNS server 120 to resolve www.domain.com is the second domain name resolution request by LDNS server 120 for this domain name and returns the IP address of SAC 101 to LDNS server 120, foregoing the actions necessary to separately load balance each request.

In another embodiment of the invention, each of clients 405, 410, and 415 represent a pool of clients. The pool of clients in client 405, repetitively use LDNS server 120 for domain name resolution. Likewise, the pools of clients in client 410 and 415 repetitively use LDNS servers 124 and 125, respectively, for domain name resolution. Because virtual EDNS server 160 relies on the requesting LDNS server's IP address (rather than the client's IP address) persistence is provided to each client in each client pool, so long as each client continues to request domain name resolution through the same LDNS server.

FIG. 5 shows a system for providing persistence when a client may use different LDNS servers for domain name resolution. FIG. 5 is similar to FIG. 4, except that clients may use a different LDNS server for each domain name resolution request. This is shown by the lines connecting each of clients 505, 510, and 515 to each of LDNS servers 121, 122, and 123. Sharing LDNS servers among clients may occur in an effort to load balance LDNS servers such that each LDNS server is given domain names to resolve commensurate with its computing power and network bandwidth.

The embodiment shown in FIG. 5 provides persistence by treating all domain requests from the set of LDNS servers that is resolving domain names for common clients as if the domain requests came from one LDNS server. The system of FIG. 5 does this by maintaining a list of LDNS servers that should be treated this way. This list may be gathered manually or automatically and may be updated from time to time. Thus, a request coming from any LDNS server in a designated set of LDNS servers is a new request when none of the LDNS servers in the set previously requested domain name resolution (within a given time period as described in more detail in conjunction with FIGS. 6 and 9) for the domain name in question. Otherwise, the request is treated as a repeat (subsequent) request and handled accordingly.

When a domain name request from one of the LDNS servers in the list is sent to any of the physical EDNS servers in virtual EDNS server 160, the physical EDNS server determines if the request is a subsequent request for a prior domain name resolution request or is a new request. When the later condition is true, load balancing calculations are performed and the LDNS server is given the IP address of a selected SAC. When the former condition is true, the persistent connections data is used to give the LDNS server the IP address of the previously selected SAC.

FIG. 6 shows illustrative data that may be included in a persistent connections data store. FIG. 6 includes persistent connections data store 465 which is used in conjunction with FIG. 4. Persistent connections data store may be implemented using many data storing devices and/or structures including a relational database, linked list, array, object-oriented database, and the like. In FIG. 6, persistent connections data store 465 includes Request_t objects 605, 610, 615, and 620. Each Request_t object may include fields such as wide IP key (a field which identifies which server a domain name request resolved to), LDNS IP address (a field which identifies the IP address of the LDNS server that requested the domain name resolution), a pointer to a virtual server object (a field that identifies which SAC the EDNS server resolved the domain name to), a time to live (a field that specifies how long the Request_t object remains valid in the absence of subsequent requests), a time stamp (a field that specifies the last time an LDNS server associated with the Request_t object requested domain name resolution for the domain name), a times hit (a field that indicates how many times an LDNS server associated with the Request_t object has requested domain name resolution for the domain name), and any other fields.

Other information may also be included in the Request_t object, such as information identifying whether the LDNS server is part of a group of LDNS servers that should be grouped together to provide persistence. One candidate for such information, for example, is when a client may use multiple LDNS servers to resolve domain names as described in conjunction with FIG. 5.

The time to live field may be set when load balancing configuration data (not shown) is loaded. For example, a user may set a relatively short time to live value by modifying a file containing the load balancing configuration data. The effect of a short time to live is that Request_t objects become invalid more quickly. This causes an EDNS server to more frequently load balance requests when subsequent requests arrive, even if related to the same transaction, because the Request_t object becomes invalid more quickly.

Alternatively, the time to live field may be modified dynamically by an EDNS server. For example, at certain hours, the time to live may be automatically increased while at other hours, the time to live may be decreased to meet transactional needs.

Figure 7:
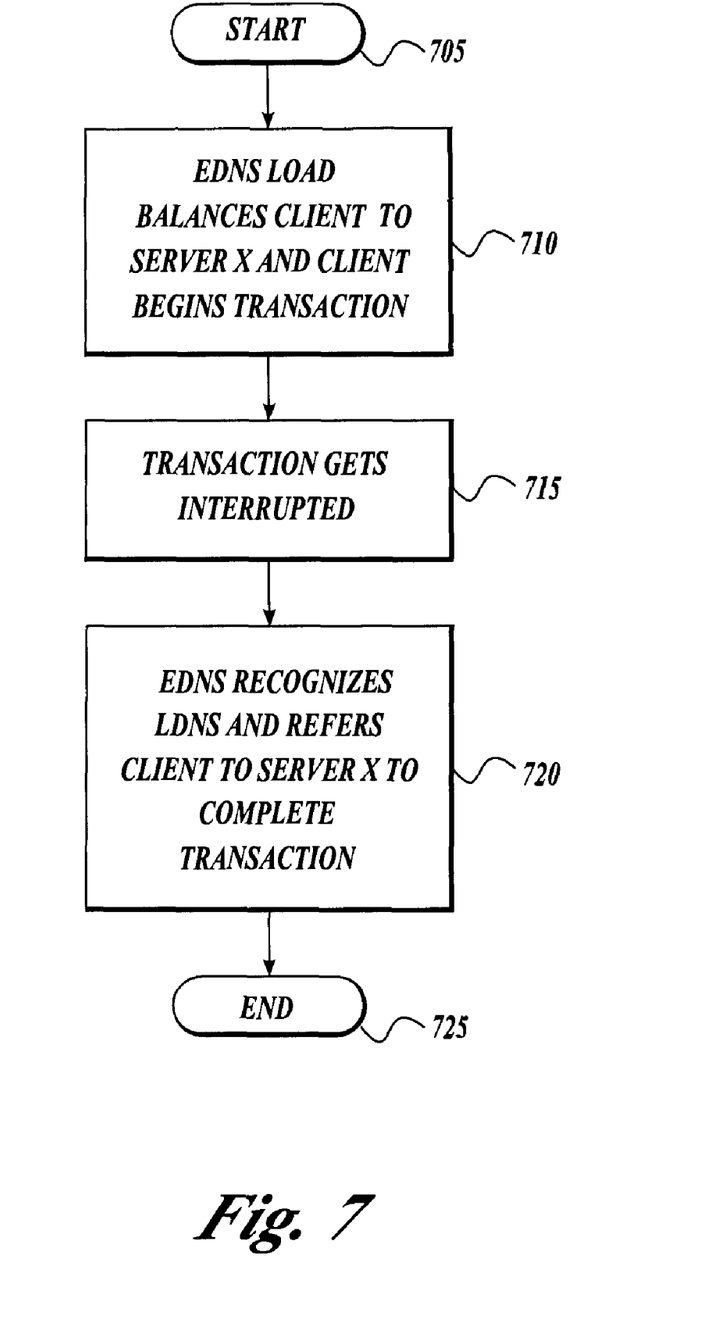
FIG. 7 illustrates a flow chart for providing persistence when a transaction between a client and a server is interrupted.
Figure 8:
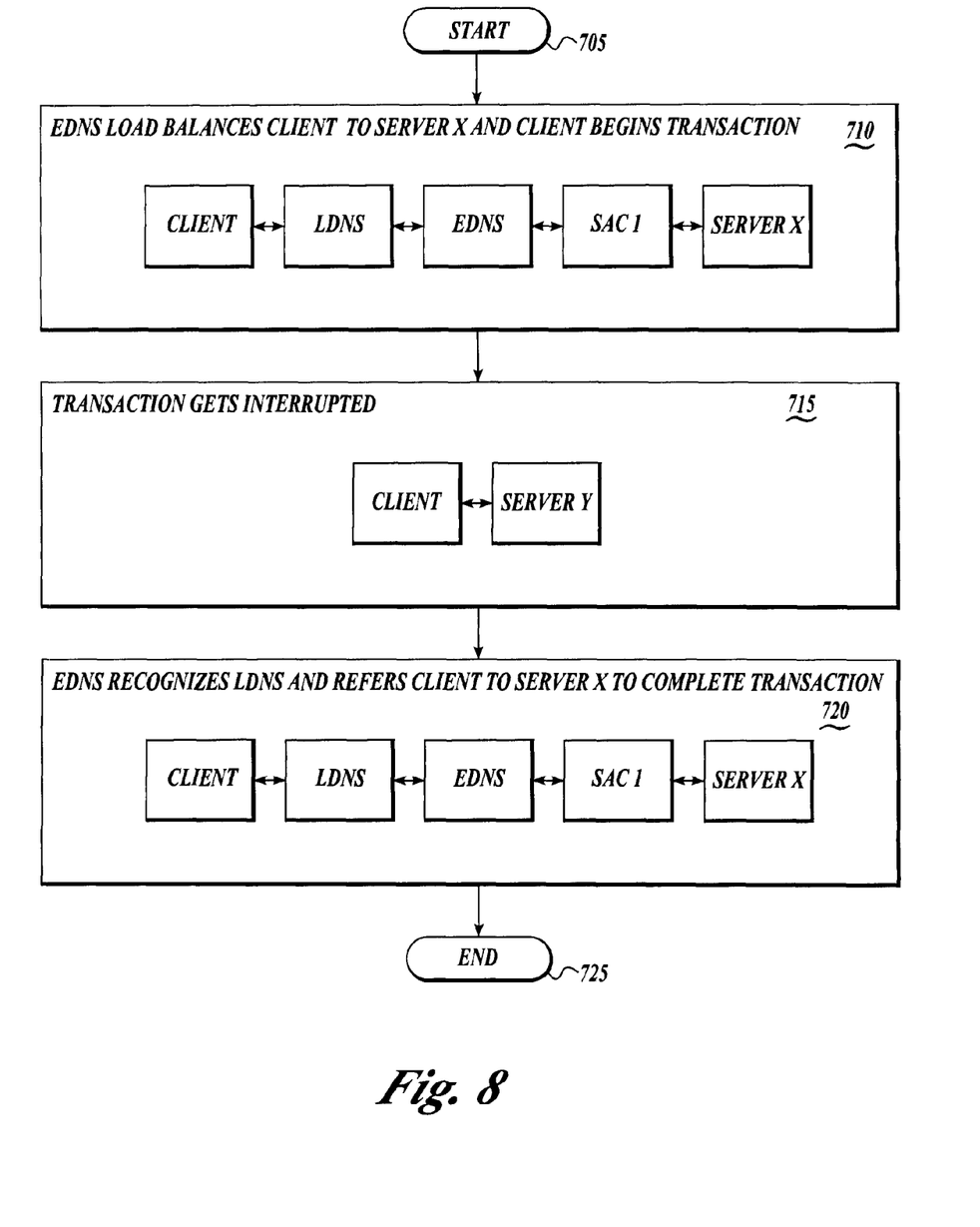
FIG. 8 illustrate another flow chart for providing persistence when a transaction between a client and a server is interrupted.

FIGS. 7 and 8 illustrate flow charts for providing persistence when a transaction between a client and a server is interrupted. The process begins at block 705, when a client initiates a request for information or services from a server associated with a domain name. For example, referring to FIG. 4, client 405 initiates a request to purchase items from a server associated with www.domain.com.

At block 710, an EDNS server load balances the client's request to a server associated with the domain name. This process is described in more detail in conjunction with block 710 of FIG. 8. In this block is shown a client, LDNS server, EDNS server, SAC 1, and a server. The client asks the LDNS server to resolve a domain name into an IP address. The LDNS server begins the resolution process and is eventually referred to the EDNS server. The EDNS server determines that no valid Request_t object exists for the combination of the LDNS server IP address and the domain name requested. Next, the EDNS server performs load balancing calculations and determines that SAC 1 should service the client's request. The EDNS server sends the IP address of SAC 1 to the LDNS server which gives it to the client. The client uses the IP address to connect to SAC 1. SAC 1 load balances the client's request to a virtual server (virtual server X) managed by SAC 1. Virtual server X satisfies the client's request.

For example, referring to FIG. 5, client 505 communicates with LDNS server 122 which communicates with virtual EDNS server 160. Virtual EDNS server 160 load balances client 505's request to SAC 101 which load balances client 505's request to a virtual server (not shown) in the virtual server array managed by SAC 101. The virtual server satisfies client 505's request.

Continuing with FIG. 7, at block 715 the transaction between the client and the server is interrupted. For example, the client may experience a power outage. The user using the client may discontinue the transaction with the server and begin another transaction with another server. In addition, the LDNS server may overwrite or lose resolution information about the domain name the client asked to be resolved, so that when the user wants to complete the transaction, the LDNS server has to look up the domain name from an EDNS server. Referring to FIG. 8, at block 715, the client is shown communicating with another server, server Y. For example, referring to FIG. 4, client 405 discontinues the session it has with a virtual server in virtual server array 110 and begins a new session with another virtual server (not shown).

Continuing with FIG. 7, at block 720, the client determines whether or not to complete the transaction. In addition, the LDNS server has overwritten or lost resolution information about the domain name the client previously asked to be resolved. Referring back to FIG. 8, a similar process to that described in conjunction with block 720 occurs, except that when the LDNS server asks the EDNS server to resolve the domain name, using persistent connections data (not shown) the EDNS server determines that the LDNS server's request is a timely continuation of a former transaction. The LDNS server returns the IP address of the SAC it previously returned and updates its data regarding the transaction. The SAC recognizes the client and refers the request to the virtual server that serviced the client's prior request. The virtual server (virtual server X) recognizes the client and retrieves information related to the transaction occurring between the client and server. For example, referring to FIG. 4, client 505 requests domain name resolution from LDNS server 120, which is eventually referred to virtual EDNS server 160. Physical EDNS server 440 fulfils LDNS server 120's request. Using persistent connections data store 460, physical EDNS server 440 determines that the request is a timely continuation of a former transaction (the time to live has not expired) and sends the IP address of SAC 101 to LDNS server 120 which forwards the IP address to client 405. Client 405 uses the IP address to connect to SAC 1 which connects the client to the previous server (not shown) in virtual server array 110. The client completes the purchase transaction with the server and closes the session with the server.

At block 725, processing ends. At this point a request has been load balanced and a subsequent request recognized and sent to the appropriate server.

Figure 9:
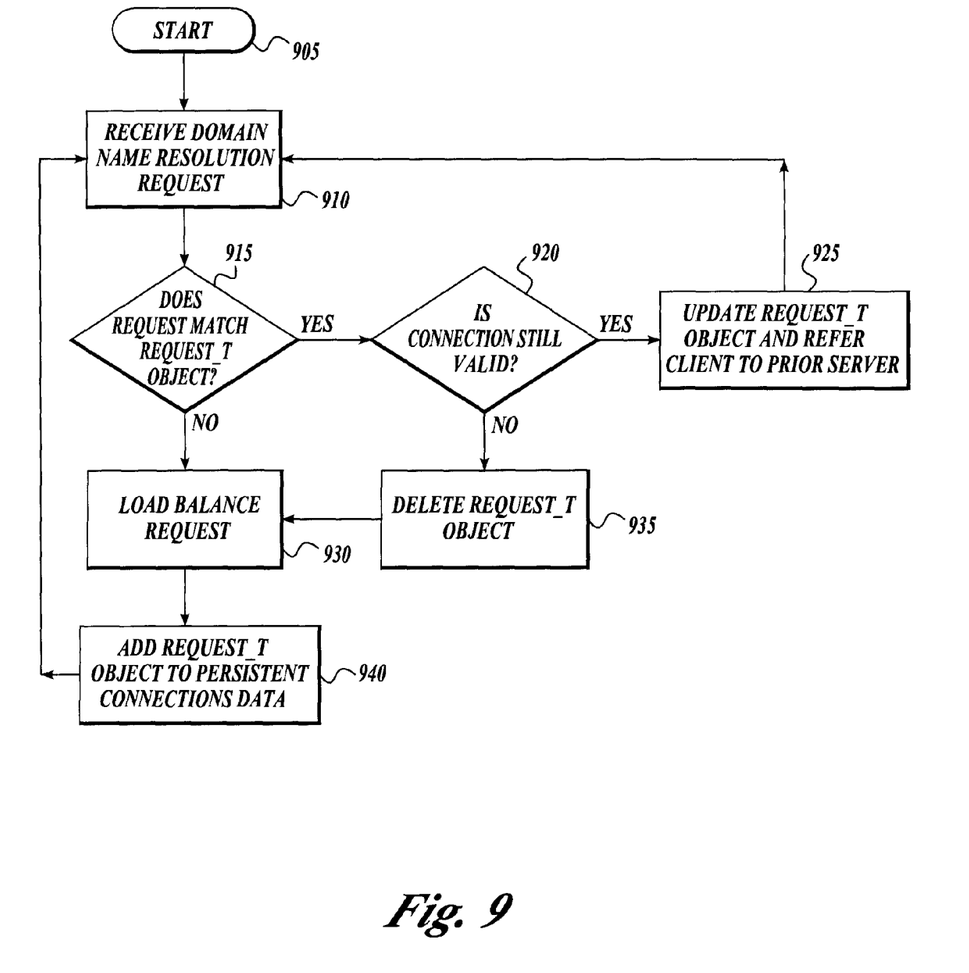
FIG. 9 shows a flow chart for providing persistence when requests are being dynamically load balanced in accordance with the invention.

FIG. 9 shows a flow chart illustrating a process for providing persistence when requests are being dynamically load balanced. The process starts at block 905 after persistence with dynamic load balancing is enabled on an EDNS server.

At block 910, a domain name resolution request is received. For example, referring to FIG. 4, physical EDNS server 445 receives a request from LDNS server 124 to resolve domain name www.domain.com.

At block 915, a determination is made as to whether the request matches a Request_t object in a persistent connections data store. The request matches a Request_t object if the request is made by the same LDNS server that made a prior request and if the request and the prior request requested a domain name resolution that would resolve to the same SAC or set of SACs. When the request matches a prior Request_t object, the yes branch is followed to block 920. Alternatively, the no branch is followed to block 930. For example, referring to FIG. 4, physical EDNS server 445 searches persistent connections data store 465 to determine whether a Request_t object exists showing that LDNS server 124 previously requested resolution of domain name www.domain.com.

At block 920, a determination is made whether the current request is a timely continuation of a previous request matching the current request. When the current request is a timely consideration, the yes branch is followed. Alternatively, the no branch is followed from block 920 to block 935. For example, referring to FIGS. 4 and 6, physical EDNS server 445 uses the time stamp field and the time to live field stored in Request_t object 605 to determine whether the time to live has expired. If the current time is greater than the time stamp plus the time to live, the time to live has expired and the Request_t object is no longer valid.

At block 925, the Request_t object is updated and the LDNS server is referred to the server identified by the wide IP key field of the Request_t object. For example, referring to FIGS. 4 and 6, physical ENDS server 445 sends the IP address of SAC 101 to LDNS server 124 in response to a subsequent request for a domain name resolution of www.domain.com. LDNS server 124 Sends this IP address to client 405 which uses it to connect to SAC 101. SAC 101 recognizes client 405 and connects the client with the server the client was previously connected to. Physical server 445 updates persistent connections data 465 by changing the Request_t object 605's timestamp to the current time.

At block 930, load balancing occurs. For example, referring to FIG. 4, physical EDNS server 445 uses metrics and a selected load balancing mode to determine which SAC's IP address it should send to LDNS server 124. Then, physical EDNS server 445 sends the selected IP address to LDNS server 124 which sends it to client 405.

At block 935, the Request_t object is deleted in preparation for adding a new Request_t object at block 940. For example, referring to FIGS. 4 and 6, EDNS server 445 causes Request_t object 605 to be deleted from persistent connections data store 465.

At block 940, a Request_t object is added to the persistent connections data store associated with the EDNS server. This allows the EDNS server to recognize subsequent requests to resolve the same domain name from the same LDNS server as described earlier. For example, referring to FIGS. 4 and 6, physical EDNS server 445 stores various connection information in a Request_t object in persistent connections data store 465. After block 940, until load balancing is disabled or the load balancing mode is changed, processing continues at block 910 where the EDNS server is ready to receive another domain name resolution request.

Illustrative Method for Providing Persistence Using Static Stripe Load Balancing FIG. 3 shows a method for providing persistence using static stripe load balancing. The process starts at block 305 before a request to resolve a domain name is received.

At block 310, a request to resolve a domain name is received. The request includes the domain name to be resolved and the IP address of the requesting LDNS server. For example, referring to FIG. 1, EDNS server 160 receives a domain name resolution request from LDNS server 120.

At block 315, modulus arithmetic is employed to select at least one SAC that manages virtual server arrays containing virtual servers that can service a client's requests for resources. A virtual server array may be dedicated to servicing requests for more than one domain name. As a result, a SAC may manage virtual servers associated with more than one domain name, such as www.domain.com and www.subsidiary.domain.com. The N in block 315 corresponds to the number of virtual servers that are currently marked "up" servicing requests for resources. For the purposes of this discussion, up means the number of virtual servers that are accepting new connections for the resources requested by the client.

One method for employing modulus arithmetic is to perform a calculation using the LDNS server's IP address and the number of virtual servers that are marked up (N). The calculation involves converting the LDNS server's IP address into an integer, dividing the integer by N, taking the remainder, and adding one. The number obtained (X) by this calculation is then used to advance through a circularly linked list of virtual servers. With each advancement through the linked list, when a virtual server is marked up, X is decremented; when a virtual server is marked down, X is not decremented. A virtual server is assumed up until it is marked down. If the last virtual server in the linked list is reached, advancing continues at the beginning of the linked list. When X reaches zero, advancing stops and a candidate virtual server has been found. For example, referring to FIG. 1, EDNS server 160 advances through a linked list (not shown) of virtual servers in arrays 110-112 according to a modulus arithmetic calculation performed by EDNS server 160 and selects a candidate virtual server from array 110.

At block 320, it is determined whether the candidate virtual server is up. Although, the virtual server may have been marked up, it may have gone down since it was marked. When the selected virtual server is up, processing continues at block 330; otherwise, processing continues at block 325. For example, referring to FIG. 1, virtual EDNS server 160 determines that the candidate virtual server in array 110 is not accepting any new connections.

At block 325, N is decremented by one indicating that a virtual server that was marked up should be marked down. For example, referring to FIG. 1, virtual EDNS server 160 marks the candidate virtual server in array 110 as down and decrements N. Note that if N reaches zero, a fallback load balancing technique (not shown) is used, such as referring the request in a round-robin load balancing mode (regardless of whether the virtual servers are accepting new connections).

At block 330, the EDNS server sends the address of the SAC managing the candidate virtual server to the LDNS which then sends it to the client. When block 330 is reached, this implies that the most recent candidate virtual server selected at block 315 was actually up. For example, referring to FIG. 1, virtual EDNS server 160 sends the IP address of SAC 101 to LDNS server 120. Web proxy 130 connects with a virtual server in array 110 that is managed by SAC 101.

At block 335, processing returns to the calling process. At this point a client has been referred to a SAC providing access to an up virtual server according to the modulus arithmetic described above.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A server for accessing a resource on a network, comprising:
    a computer-readable storage device that stores instructions which when executed on the server enable actions including:
        receiving a request for the resource from a connection that is associated with a client;
        enabling selection of a method to select one of a plurality of server array controllers to handle each request from the connection to the resource;
        enabling selection of a method for load balancing each request from the connection, wherein the selected load balancing method employs modulus arithmetic to select a virtual server managed by the selected server array controller;

storing connection data for the connection, including at least a first data that identifies the selected virtual server and a second data that identifies the selected server array controller; and referring each request that is associated with the connection to the selected server array controller based on the stored connection data including at least the first data and the second data, until another method is selected for load balancing each request from the connection, wherein the selected server array controller associates the client's connection with the requested resource and manages one or more virtual servers.

2. The server of claim 1, wherein if the selected virtual server is determined to be down, the selected load balancing method performs further actions, including:

marking the down selected virtual server as unavailable;

decrementing a total amount of available virtual servers by 1 to create a value for N; and employing the value for N to select another virtual server array.

3. The server of claim 1, wherein the selected server array controller associates the requestor with a virtual server that includes the resource, and wherein the virtual server is managed by the selected server array controller.

4. The server of claim 1, wherein the request includes an IP address associated with the requestor, another IP address associated with the selected server array controller, and a time stamp.

5. The server of claim 1, wherein the server is operable as a Local Domain Name Server (LDNS).

6. The server of claim 1, wherein the server is operable as an Extended Domain Name Server (EDNS).

7. A method for accessing a resource on a network, comprising:

receiving a request for the resource from a connection that is associated with a requestor;

enabling selection of a method to select one of a plurality of server array controllers to handle each request from the connection to the resource;

enabling selection of a method for load balancing each request from the connection, wherein the selected load balancing method employs modulus arithmetic to select a virtual server managed by the selected server array controller;

storing connection data for the connection, including at least a first data that identifies the selected virtual server and a second data that identifies the selected server array controller; and referring each request that is associated with the connection to the selected server array controller based on the stored connection data including at least the first data and the second data, until another method is selected for load balancing each request from the connection, wherein the selected server array controller associates the requestor's connection with the requested resource and manages one or more virtual servers.

8. The method of claim 7, wherein if the selected virtual server is determined to be down, the selected load balancing method performs further actions, including:

marking the down selected virtual server as unavailable;

decrementing a total amount of available virtual servers by 1 to create a value for N; and employing the value for N to select another virtual server array.

9. The method of claim 7, wherein the selected server array controller associates the requestor with a virtual server that includes the resource, and wherein the virtual server is managed by the selected server array controller.

10. The method of claim 7, wherein the request includes an IP address associated with the requestor, another IP address associated with the selected server array controller, and a time stamp.

11. A computer readable media that stores executable data for enabling actions that access a resource on a network, the actions comprising:

receiving a request for the resource from a connection that is associated with a requestor;

enabling selection of a method to select one of a plurality of server array controllers to handle each request from the connection to the resource;

enabling selection of a method for load balancing each request from the connection, wherein the selected load balancing method employs modulus arithmetic to select a virtual server managed by the selected server array controller;

storing connection data for the connection, including at least a first data that identifies the selected virtual server and a second data that identifies the selected server array controller; and referring each request that is associated with the connection to the selected server array controller based on the stored connection data including at least the first data and the second data, until another method is selected for load balancing each request from the connection, wherein the selected server array controller associates the requestor's connection with the requested resource and manages one or more virtual servers.

12. The media of claim 11, wherein if the selected virtual server is determined to be down, the selected load balancing method performs further actions, including:

marking the down selected virtual server as unavailable;

decrementing a total amount of available virtual servers by 1 to create a value for N; and employing the value for N to select another virtual server array.

13. The media of claim 11, wherein the selected server array controller associates the requestor with a virtual server that includes the resource, and wherein the virtual server is managed by the selected server array controller.

14. The media of claim 11, wherein the request includes an IP address associated with the requestor, another IP address associated with the selected server array controller, and a time stamp.

15. A system for enabling access to a resource on a network, comprising:

a client machine that is coupled to the network; and a server that includes a computer-readable storage device that stores instructions which when executed perform actions including:

receiving a request for the resource from a connection that is associated with the client;

enabling selection of a method to select one of a plurality of server array controllers to handle each request from the connection to the resource;

enabling selection of a method for load balancing each request from the connection, wherein the selected load balancing method employs modulus arithmetic to select a virtual server managed by the selected server array controller;

storing connection data for the connection, including at least a first data that identifies the selected virtual server and a second data that identifies the selected server array controller; and referring each request that is associated with the connection to the selected server array controller based on the stored connection data including at least the first data and the second data, until another method is selected for load balancing each request from the connection, wherein the selected server array controller associates the client's connection with the requested resource and manages one or more virtual servers.

16. The system of claim 15, wherein if the selected virtual server is determined to be down, the selected load balancing method performs further actions, including:

marking the down selected virtual server as unavailable;

decrementing a total amount of available virtual servers by 1 to create a value for N; and employing the value for N to select another virtual server array.

17. The system of claim 15, wherein the selected server array controller associates the client with a virtual server that includes the resource, and wherein the virtual server is managed by the selected server array controller.

18. The system of claim 15, wherein the request includes an IP address associated with the client, another IP address associated with the selected server array controller, and a time stamp.

19. The system of claim 15, wherein the server is operable as a Local Domain Name Server (LDNS).

20. The system of claim 15, wherein the server is operable as an Extended Domain Name Server (EDNS).

* * * * *